(12) United States Patent
McVey (10) Patent No.: US 7,808,399 B2
(45) Date of Patent: Oct. 5, 2010

(54) ELECTRONIC DEVICE ENABLING HARDWARE AND METHODS

(75) Inventor: James D. McVey, Palo Alto, CA (US)

(73) Assignee: Finisar Corporation, Sunnyvale, CA (US)

( * ) Notice: Subject to any disclaimer, the term of this patent is extended or adjusted under 35 U.S.C. 154(b) by 1236 days.

(21) Appl. No.: 11/313,020

(22) Filed: Dec. 20, 2005

(65) Prior Publication Data

US 2007/0143607 A1    Jun. 21, 2007

(51) Int. Cl.
*G01V 3/00*    (2006.01)
(52) U.S. Cl. .............................. 340/854.7; 340/870.28; 398/138
(58) Field of Classification Search .............. 340/10.42, 340/5.1, 854.7, 870.28; 398/137, 138, 135, 398/25
See application file for complete search history.

(56) References Cited

U.S. PATENT DOCUMENTS 6,351,418 B1 *   2/2002   Tomohiro .............. 365/189.03
6,862,302 B2 *   3/2005   Chieng et al. ............ 372/29.02
7,142,851 B2 *   11/2006  Zhang et al. ............. 455/426.2

* cited by examiner

*Primary Examiner*—Vernal U Brown
(74) *Attorney, Agent, or Firm*—Workman Nydegger (57) ABSTRACT

The teachings described herein are generally concerned with systems and methods for selectively enabling an electronic device, such as an optical transceiver, that is configured to communicate with a remote computer. In one example of such a method, identification data is initially transmitted from the electronic device to the remote computer. At the remote computer, a determination is made as to whether the identification data is valid. If the identification data is valid, the remote computer generates encrypted data based upon the valid identification data. The encrypted data is then transmitted to the electronic device, where the encrypted data and the identification data are process to facilitate a determination as to whether operation of the electronic device will be enabled. The scope or extent to which the electronic device can be enabled is defined by predetermined criteria.

18 Claims, 6 Drawing Sheets

ELECTRONIC DEVICE ENABLING HARDWARE AND METHODS

BACKGROUND OF THE INVENTION

1. The Field of the Invention

The present invention relates generally to the selective operability of electronic devices. More particularly, embodiments of the present invention relate to microchips, electronic devices, and methods of selectively enabling or disabling their operability.

2. Related Technology

Theft is one of the driving forces behind the development of various security precautions for restricting access to a product, or requiring the proper authorization before enabling operation of a product. Accordingly, theft may be deterred when the stolen property is inaccessible, will not function, and/or is rendered essentially valueless. Since theft plagues both consumers and companies alike, and causes a tremendous drain on resources, companies have been forced to compare the costs and benefits of theft deterrence. The economic benefit of theft deterrence to both consumers and companies has resulted in products that include security features.

It is common for a product to require the use of some type of security authorization in order to enable operability of that product. The security authorization does not have to be a physical object, such as a key, but can be a security code, such as the verification code required to be entered into a computer before software becomes operational. For example, security codes can be used to restrict the users to specific people with the proper authorization, or limit the duration of operability to a particular length of time or number of uses. However, if a thief obtains a copy of the key or verification code, all the thief has to do is implement the key or code into the product to gain access and the ability to operate the product. With respect to software products, once a verification code is known, the code can be transmitted along with the product, and anyone with possession of the product and the associated verification code can access and operate the product.

Sometimes market demands can be in conflict with the need to provide security features to prevent theft and unauthorized uses, which can be seen in the electronics industry. Since many microchips and electronic products have been developed to provide maximum functionality within the smallest possible space, the likelihood that the chips or electronic products will be easily stolen has increased. This problem is particularly acute for small, but high value, components that are readily pilferable. One example of such a component is an optical transceiver. Accordingly, the need for security features can compromise the ability to produce small and cost efficient electronics.

The development of electronics has also provided the ability to tailor hardware and/or software to include various functionalities, which can include enabling or disabling the operability of an electronic product. Accordingly, some electronic products have been equipped to include a security feature that only enables operability for authorized users. Unfortunately, if the security feature is retained within the product itself, then the security feature may be accessible and provide enough incentive for someone to figure out how to overcome that security feature. For example, a safe with an electronic lock can be secured when the combination is unknown. However, a sophisticated thief may be able to hack the electronic lock and obtain the combination.

Additionally, if the security feature is on the product and the security feature can be circumvented, then all other similar devices with a similar security feature may also become compromised. One example of such a device is a smart card with a cryptographic chip that stores the security code needed to utilize the card. The security chips on different smart cards can be defeated in a similar manner by removing layers of the chip and using laser beams to write particular bits to get around the cryptographic technique. The value obtained by defeating such security features can provide the incentive to figure out how these features can be circumvented.

In view of the foregoing, and other, problems in the art, it would be advantageous to provide an electronic device that receives security information from a remote location and implements the security information within the electronic device to selectively enable the electronic device.

BRIEF SUMMARY OF AN EXEMPLARY EMBODIMENT OF THE INVENTION

In general, embodiments of the invention are concerned with electronic devices that can be selectively enabled. Accordingly, exemplary embodiments of the invention are directed to an electronic device that can receive security information from a remote location and implement the security information in order to enable the electronic device.

In one exemplary embodiment, the present invention provides a method for selectively enabling an electronic device when the electronic device is in communication with a remote computer. Such a method includes transmitting identification data from a memory of the electronic device to the remote computer. In order for the identification data to be transferred, both the electronic device and remote computer include transmitters and receivers.

After the remote computer receives the identification data from the electronic device, the remote computer generates encrypted data based upon the identification data. By conducting this data generation in a remote computer, an aspect of the security process is performed independent of the electronic device. After the encrypted data has been generated, the encrypted data is then transmitted from the remote computer to the originating electronic device.

Upon receipt of the encrypted data, the electronic device processes the encrypted data through an algorithm. In particular, the encrypted data is processed through an algorithm in order to determine whether the electronic device will be enabled based on the identification data, previously submitted to the remote computer, and the encrypted data, subsequently received from the remote computer. If the identification data corresponds with the encrypted data, the electronic device is then enabled. However, if the identification data does not correspond with the encrypted data, the electronic device will not be enabled.

These and other aspects of exemplary embodiments of the present invention will become more fully apparent from the following description and appended claims.

BRIEF DESCRIPTION OF THE DRAWINGS

To further clarify the above and other aspects of the present invention, a more particular description of the invention will be rendered by reference to specific embodiments thereof which are illustrated in the appended drawings. These drawings depict only exemplary embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS OF THE INVENTION

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

I. Exemplary Operating Environments

Figure 1:
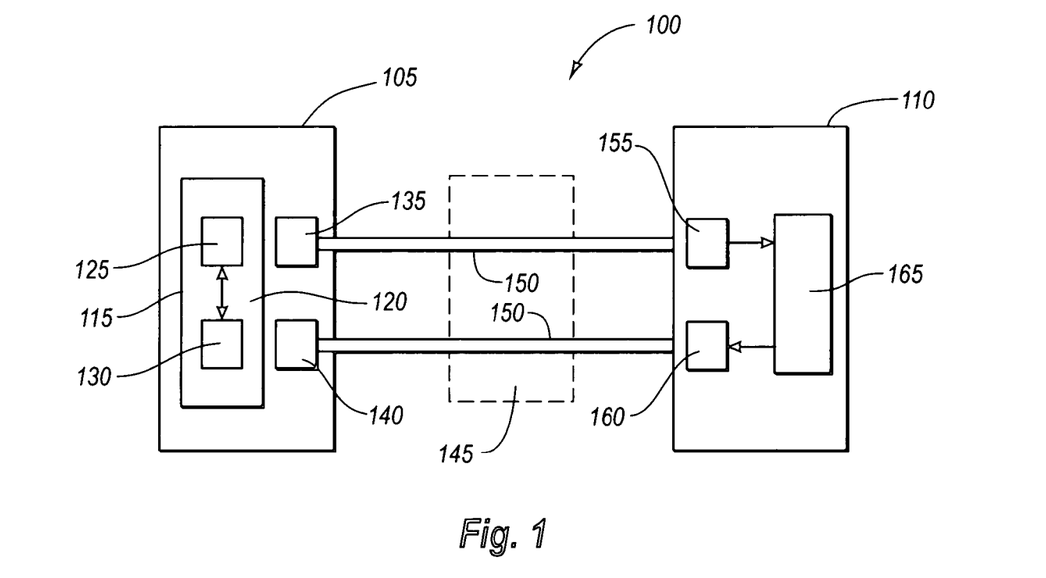
FIG. 1 is a schematic diagram that illustrates various aspects of an exemplary operating environment for embodiments of the present invention.

With reference first to FIG. 1, details are provided concerning various aspects of the general architecture of an exemplary embodiment of an operating environment 100 in connection with which devices, such as an electronic device 105 for example, may be selectively enabled. Generally, the operating environment 100 includes the electronic device 105 in communication with a remote computer 110. In general, the operating environment 100 is configured such that the electronic device 105 implements a security protocol utilizing data obtained from the remote computer 110 before the electronic device 105 is enabled for operation.

The electronic device 105 is equipped with an enablement microchip 115. The enablement microchip 115 includes a printed circuit board 120 having memory 125 and a processor 130 programmed with algorithms for, among other things, manipulating encrypted data received from the remote computer 110. The memory 125 and/or the processor 130 can be application specific integrated circuitry ("ASIC"). The enablement microchip 115, and particularly the memory 125, is configured to retain identification data unique to the electronic device 105.

Additionally, the electronic device 105 includes communications ports 135 and 140 for communicating with the remote computer 110 over a data communication network 145. In alternative implementations, only a single input/output ("I/O") port is employed. The communications ports 135 and 140 are communicatively coupled to the remote computer 110 through respective portions of a data communication link 150. As suggested in FIGS. 1 and 2, discussed below, the electronic device 105 and remote computer 110 may communicate with each other by way of a dedicated data link, such as the data link 150, a data communication network, such as the data communication network 145, or a combination of a data link connected to a data communication network. It should be noted that the scope of the invention is not limited to any particular communications scheme or configuration.

The data communication network 145 can extend over a long range, where the electronic device 105 is positioned at one node within the data communication network 145, and the remote computer 110 is positioned at another node. In one aspect, the data communication network 145 is the Internet, or at least a portion of the data communication network 145 can utilize a portion of the Internet. The use of the Internet as a portion of the data communication network 145 is often convenient because of the availability and prevalence of locations where the Internet can be accessed. Use of the Internet enables a manufacturer or distributor to set up a website for customers to access in order to initiate the security protocol for the enabling electronic device 105.

In other cases, the data communication network 145 comprises a wide-area network ("WAN"). The use of the Internet or a WAN allows for consumers over a broad area to be able to plug their electronic device 105 into the data communication network 145 and communicate with the remote computer 110. Alternatively, the data communication network 145 comprises a LAN or an intranet. The use of a LAN or intranet as the data communication network 145 can include safety features, such as firewalls for example, to prevent access from outside of secured locations. As such, a LAN or intranet can be used so that the electronic device 105 communicates with a remote computer 110 that is nearby or within the same facility.

Accordingly, embodiments of the invention are suitable for use in conjunction with various high speed data transmission systems, examples of which include Gigabit Ethernet ("GE"), 10 GigE, Fiber Distributed Data Interface ("FDDI"), Fibre Channel ("FC"), Synchronous Optical Network ("SONET"), and InfiBand protocols. Configuring the electronic device 105 and the remote computer 110 to communicate with equipment conforming to the Gigabit Ethernet ("GigE") physical specification is exemplary only and embodiments of the invention may, more generally, be employed in any of a variety of these and other high speed data transmission systems, some of which may have line rates up to, or exceeding, 10 Gb/s.

The remote computer 110 can receive data via a communications port 155 in the remote computer 110, where the communications port 155 is coupled with the data communication link 150. The remote computer 110 further includes a communications port 160 and an encrypted data generator 165. The communications ports 155 and 160 are, in some implementations, combined into a single I/O communications port. Generally, after identification data is received by the remote computer 110 from the electronic device 105, the remote computer 110 can process the received identification data through the encrypted data generator 165 to produce encrypted data. After the encrypted data is generated, the encrypted data is transmitted, by way of the communication port 160, back to the electronic device 105 by way of the data communication network 145, via the data communication link 150, or by way of both the data communication link 150 and the data communication network 145, depending upon the particular configuration of the operating environment.

Figure 2:
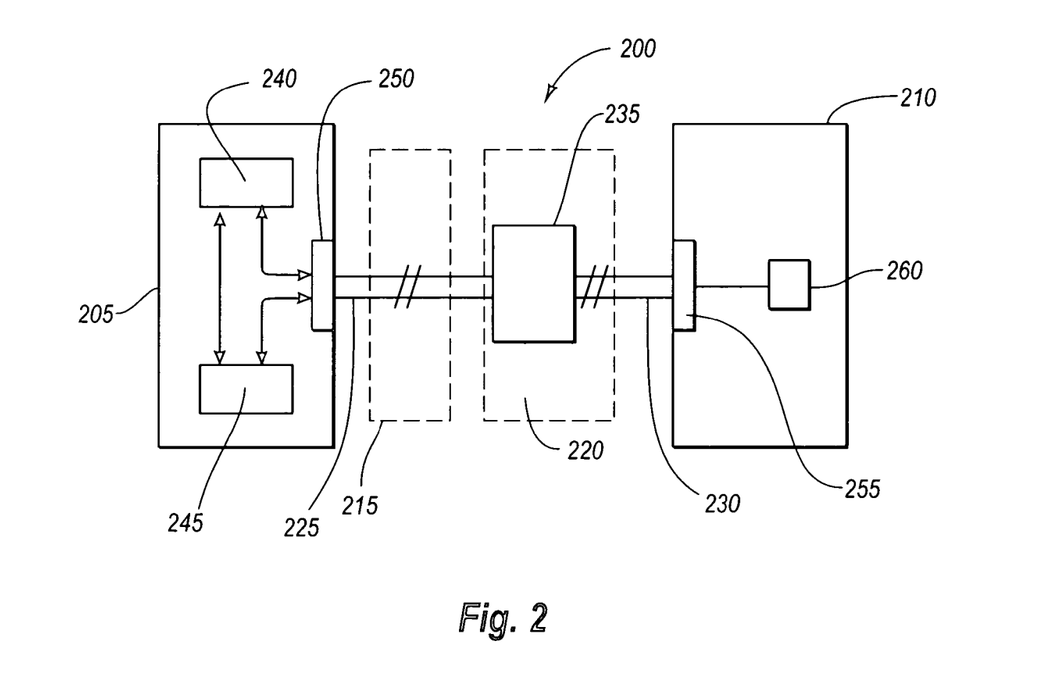
FIG. 2 is a schematic diagram that illustrates aspects of an alternative embodiment of an operating environment for embodiments of the present invention.

With reference now to FIG. 2, some exemplary embodiments of the present invention are implemented in connection with a secure operating environment 200. In the secure operating environment 200, an electronic device 205 communicates with a remote computer 210 through a public data communication network 215, and a secure data communication network 220. Similar to the data communication network 145 of FIG. 1, the public data communication network 215 can be the internet, or at least a portion of the public data communication network 215 can be the internet. The public data communication network 215 includes a public data communication link 225 for propagating data between the electronic device 205 and the secure data communication network 220. Additionally, the public data communication network 215 and/or the secure data communication network 220 can include the internet, WAN, LAN, and/or intranet.

The secure data communication network 220 includes a secure data transmission link 230 that is interfaced with security equipment 235. The security equipment 235 can include a security firewall or other appropriate communications security equipment. In general, the security equipment 235 prevents unauthorized access into the secured data communication network 220 and any communication equipment inside of the secured data communication network 220. Correspondingly, the security equipment 235 allows authorized access into the remote computer 210 via the secure data communication link 230.

In the exemplary illustrated embodiment, the electronic device 205 includes a memory 240 in communication with both an algorithm circuit 245 and a transceiver 250. In one aspect, the transceiver 250 can be an optical transceiver. The transceiver 250 transmits and receives data from the public data communication network 215 and the secured data communication network 220 by way of the public data communication link 225.

Also, the remote computer 210 can be similar to the remote computer of FIG. 1. In one aspect, the remote computer 210 includes a transceiver 255 in communication with an encrypted data generator 260. As with the electronic device 205, the transceiver 255 in the remote computer 210 can be an optical transceiver. The transceiver 255 transmits and receives data through the secured data communication network 220 and the public data communication network 215 by being coupled to the secured data communication link 230.

II. Exemplary Electronic Devices

Figure 3:
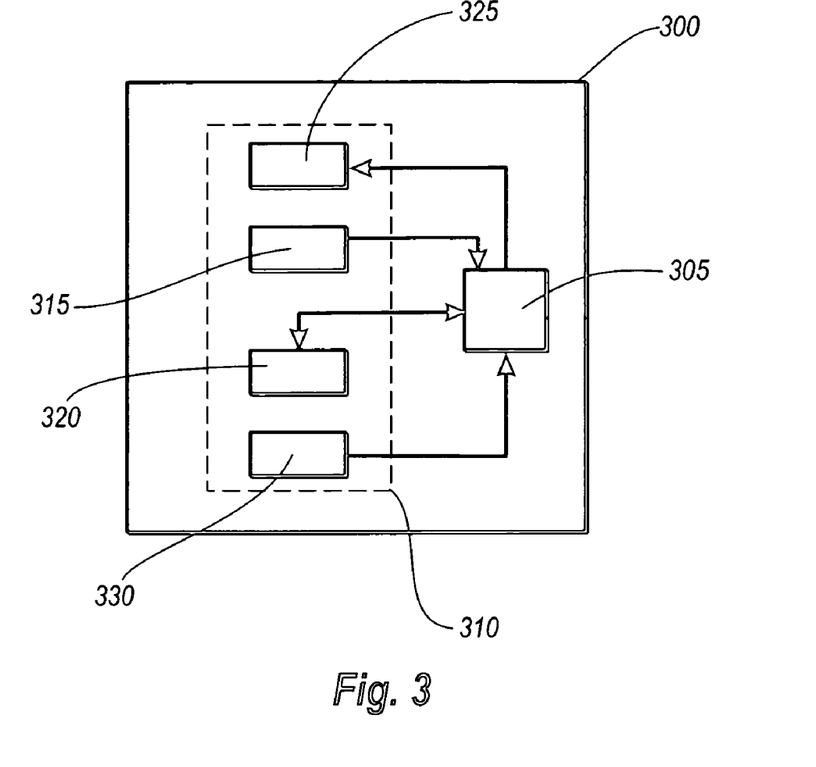
FIG. 3 is a schematic diagram that illustrates aspects of an exemplary electronic device configured for selective enablement.

With attention now to FIG. 3, details are provided concerning an exemplary embodiment of an electronic device 300 configured to be selectively enabled in accordance with the present invention. In some implementations, the electronic device 300 comprises an optical transceiver, but the scope of the invention is not so limited and, rather, extends to any other electronic devices in connection with which it would be useful to implement aspects of the functionality disclosed herein.

The exemplary electronic device 300 includes a microcontroller 305 that controls the operation of various components within an enablement architecture 310. Also, the microcontroller 305 can be integrated within the enablement architecture 310. The enablement architecture 310 further includes memory 315, algorithm circuitry 320, a transmitter 325, and a receiver 330.

In one aspect, any of the components of the enablement architecture 310 can be integrated within an enablement microchip (not shown), where such integration occurs at an early stage in the manufacturing of the electronic device 300. Placing the enablement microchip in the electronic device 300 at an early stage can lend to decreasing the desire to steal these products. This can be because the value of a stolen electronic device that is unfinished is lower in comparison with the time and costs of overcoming the security system and finishing the electronic device. Accordingly, unfinished products implementing aspects of the methods and devices disclosed herein are relatively less susceptible to being stolen and completed elsewhere.

The memory 315 is configured to include identification data that, as suggested earlier, identifies the electronic device 300. The memory 315 format can be read-only memory ("ROM"), programmable read-only memory ("PROM"), erasable read-only memory ("EPROM"), electronically erasable read-only memory ("EEPROM"), or other memory. Identification data refers to data usable as an aspect of a security feature, where the identification data is encoded into, or stored within, and corresponds to the electronic device 300. The identification data can be device-specific, such as a serial number or device type specific, such a model number. Alternatively, the identification data can be any number along with its corresponding complement. The identification data can be any series of numbers, and can be simple or complex depending on the various needs including the level of security desired.

In one embodiment, the memory 315 is configured to contain more than one identification data set, where each data set corresponds to a specific period of time for which the electronic device 300 is enabled. For example, some embodiments of the memory 315 are configured to include 5 identification data sets, where the first enables operability for 5 minutes, the second for 5 hours, the third for 5 days, the fourth for 5 weeks, and the fifth for unlimited enablement. Of course, these periods of time are exemplary only, and the period of time of enablement can range from no operability to unlimited enablement, which can include any incremental time period in between, such as one day, one week or one month. The electronic device 300 can have an input/output interface (not shown) so that a user can select how long to enable the electronic device 300, which determines which identification data set will be sent to the remote computer. Accordingly, the electronic device 300 can include a processor clock or simple timer that logs the clock cycles to determine the duration of enablement.

In addition, or as an alternative, to using identification data as a basis for the enablement of an electronic device, embodiments of the invention use the identification data as a basis for determining the scope of functionality that will be enabled in a particular device. As the preceding discussion suggests, at least some minimal communications functionality must be present in the device prior to sale, since the device has to be able to communicate with the remote computer in order that additional functionality can be enabled. Thus, exemplary devices are initially enabled with a 'base' functionality, that can then be expanded to include, among other things, the exemplary functionality disclosed herein. As the foregoing suggests, the scope of the expanded functionality that could possibly be enabled in a particular device can be predetermined, typically at the time of manufacture.

For example, operation of a particular transceiver may be enabled only for a selected data rate, or group of data rates. As another example, noted above, the time duration of the operability of the device may be predefined as well. In the case of an optical transceiver for example, the enabled functionality is limited so that only the transmitter, or only the receiver is operable. In another case, the enabled functionality is defined such that one or more of the transceiver alarms, such as a high temperature alarm, laser bias alarm or input voltage alarm for example, are turned on, or off. More generally however, one or more different functionalities of the electronic device can be enabled separately, or functionalities can be grouped together to define a package of functionalities, all of which will be enabled upon satisfaction of the enablement criteria.

Groupings of one or more such functionalities may be referred to herein as a functionality profile. Finally, as noted elsewhere herein, a time dimension can also be incorporated into the enablement of such functionalities, so that selected functionalities of the electronic device are enabled at various times, and/or for various time durations.

The electronic device 300 additionally includes data paths, indicated in phantom, that enable the transfer of data between different components or subcomponents in communication with each other within the selective enablement architecture 310 or between any of the components within the electronic device 300. Accordingly, a data path can be an optical or electrical communication path that propagates an optical or electrical signal. When two or more components or a group of components need to transfer data in order to allow the electronic device 300 to function properly, the components can be configured to communicate with an optical or electrical data signal. Also, the data paths can be single paths, multiple paths, dual channel paths, duplex, simplex or bidirectional paths. One or more of the data paths communicate, in some implementations, with external systems and devices, such as by way of an I²C interface included in the electronic device 300.

With continuing reference to FIG. 3, the microcontroller 305 is configured to be in communication with the memory 315 that contains the identification data that, in this embodiment, is specific to the electronic device 300. The microcontroller 305 is configured to retrieve the identification data from the memory 315 through a data path when there has been an attempt to operate the electronic device 300.

Additionally, the microcontroller 305 is in communication with a transmitter 325 and a receiver 330, where both are configured to connect with communication networks for transmitting and receiving identification data. Specifically, the transmitter 325 is configured to transmit identification data to a remote computer, and the receiver 330 is configured to receive encrypted data back from the remote computer.

Also, the microcontroller 305 is configured to transfer encrypted data, which has been received by the electronic device 300, to the algorithm circuit 320 so that the encrypted data can be processed through an algorithm and compared with the identification data in the memory 315 of the electronic device 300. The microcontroller 305 is further configured to access the results of the processing of the encrypted data through the algorithm.

Figure 4:
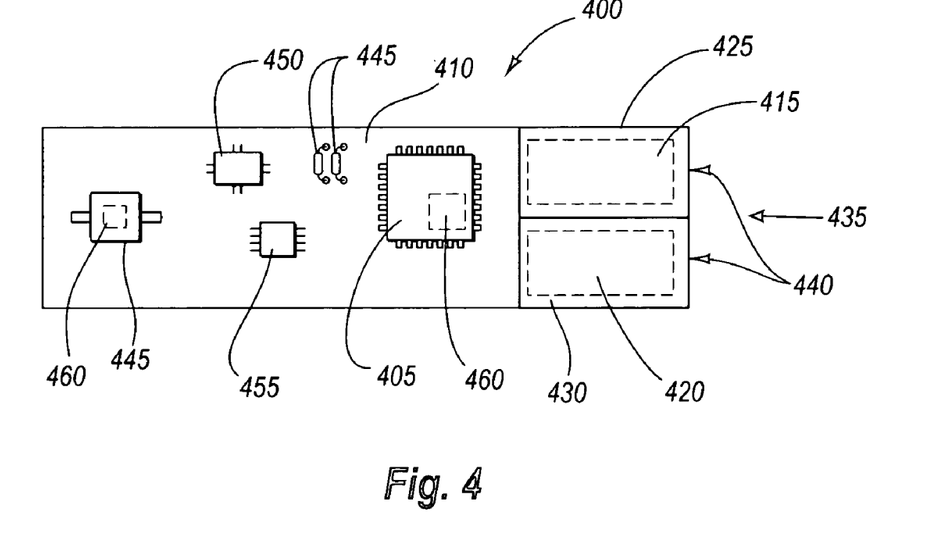
FIG. 4 is a schematic diagram that that illustrates aspects of an exemplary embodiment of an optical transceiver.

FIG. 4 illustrates aspects of another exemplary embodiment of an electronic device in accordance with the present invention. In particular, an optical transceiver ("transceiver") 400 is illustrated. The optical transceiver 400 includes a microcontroller 405 on a printed circuit board ("PCB") 410, as well as a 'transmit' optical subassembly ("TOSA") 415 and a 'receive' optical subassembly ("ROSA") 420. The TOSA 415 can be contained within a TOSA housing 425, and the ROSA 420 can be contained within a ROSA housing 430, where the housings 425 and 430 are a part of a connector portion 435 of the optical transceiver 400. The connector portion 435 includes receptacles 440 configured to operatively receive a corresponding modular fiber connector, such as is typically used to interface with an optical fiber cable. However, it should be appreciated that the receptacle 440 can be configured to accommodate any current or future connector assembly.

The PCB 410 also includes transceiver electronics 445, memory 450 and algorithm circuitry 455. Optionally, the memory 450 and algorithm circuitry 455 can collectively comprise an integrated component 460, where the integrated component 460 or separate memory 450 and algorithm circuitry 455 can optionally be further integrated into the transceiver electronics 445 or into the microcontroller 405. As the foregoing makes clear, the scope of the invention is not limited to any particular circuitry or circuitry configuration, either within the transceiver 400 or any other electronic, electrical, or optoelectronic device.

In accordance with the present invention, the transceiver 400 can be the electronic device or a component within the electronic device. By providing selective enablement to a transceiver 400, the transceiver 400 can be incorporated into various electronic devices to implement the security feature that requires remotely accessing and retrieving the security authorization or processing through a security protocol. Also, the transceiver 400 can facilitate the transmission and reception of information between the electronic device and the remote secured computer.

III. Operational Aspects of Exemplary Embodiments

When there is an attempt to operate an electronic device that is equipped with an enablement microchip or other equivalent security feature to provide the electronic device with selective enablement, the electronic device can process through a method for authorizing enablement, such as a security protocol, to determine whether the operation is authorized. Of course, the electronic device needs at least some basic operability, or base functionality, in order to communicate with a remote computer so that the enablement process can be performed. As such, the electronic device can be configured in various ways to ensure that complete operability, or some other group of predetermined device functions, is not enabled until the security protocol has been successfully completed. In one aspect, the electronic device can be configured to automatically establish communication with the remote computer when power is provided to the electronic device. In this scenario, the electronic device can be powered up, but will not function except for determining whether enablement is authorized. In another aspect, the electronic device can be configured to operate for a limited time, such that the user is informed about the time remaining before the electronic device becomes inoperable. Thus, an electronic device that has not been selectively enabled can, in at least some embodiments, still operate with certain limitations and restrictions.

In an exemplary embodiment, a method 500 for selectively enabling an electronic device is now described with reference to FIG. 5. In response to an attempt to operate the electronic device, the method 500 can include the electronic device assessing, at stage 514, whether it is in communication with an appropriate remote computer that has an encrypted data generator. If the electronic device is not able to communicate with such a remote computer, or other system or device of comparable functionality, the electronic device stops attempting to authorize enablement at stage 516. In addition, the electronic device may alert a user that a communication link with the remote computer has not been established.

The requirement that the electronic device connect to a data communication network and communicate with a remote computer before enablement of the electronic device can serve various purposes. For example, such communications can be tracked so that the serial numbers (identification data) of each electronic device processed through the security protocol can be captured. Thus, a manufacturer can be notified when a serial number corresponding to a stolen device has been sent to the remote computer. This possibly could be used to track the location where the use of the device has been attempted. Additionally, the remote computer will terminate an attempted enablement process if the process is initiated by a device reported to be stolen. If peddlers and/or consumers of stolen electronic devices are required to process through the security protocol, and the device will not otherwise function, the desirability to steal such equipment may be diminished.

Additionally, when consumers in the secondary market figure out that certain devices cannot operate without authorization from the remote computer, the secondary market may disappear. As this happens, either demand from the manufacturer may increase, or the desirability to steal such devices for sale in the secondary market may be decreased. Either result is desirable from the point of view of the manufacturer.

Figure 5:
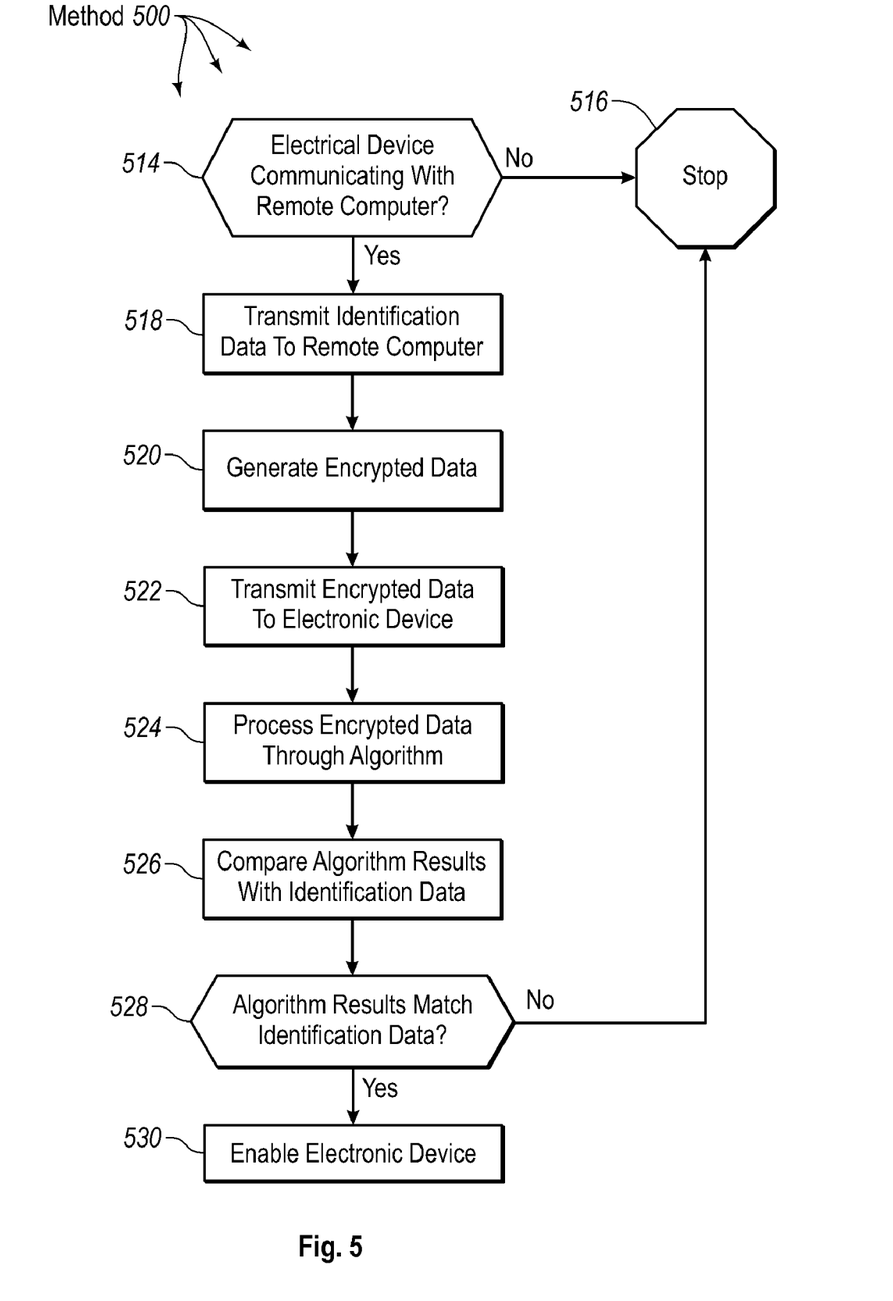
FIG. 5 is a flow diagram indicating general aspects of an exemplary method for selectively enabling an electronic device.

With continuing reference to FIG. 5, when the electronic device is able to communicate with the remote computer, the electronic device accesses identification data that corresponds with the electronic device from the memory. The electronic device then transmits the identification data to the remote computer at stage 518. When the remote computer has received the identification data from the electronic device, the remote computer generates, at stage 520, encrypted data that corresponds to the identification data.

Generally, such encrypted data refers to data generated at a remote computer that is transmitted to an electronic device and processed through an algorithm in order that a determination can be made as to whether operation of the electronic device will be enabled. More particularly, the generation of encrypted data involves a process in which identification data, from the device which is desired to be enabled, is input into a computer and encrypted data is obtained as an output. Such encrypted data can be generated by a cryptography algorithm or other process, system or device capable of creating and/or manipulating data from, and corresponding with, the identification data. In one aspect, the process of generating encrypted data can include selecting encrypted data that corresponds with the identification data, or merely matching the identification data from the electronic device with predetermined encrypted data, such as through the use of a public/private key arrangement. In some instances, the encrypted data can be a complex, or simple, security code. Additionally, the encrypted data can be specific to identification data that limits the duration of enablement, or otherwise defines or corresponds with some parameter relating to the functionality desired to be enabled.

With continuing reference to FIG. 5, after the encrypted data has been generated, the remote computer transmits the encrypted data back to the originating electronic device at stage 522. At stage 524, the electronic device then processes the encrypted data through a suitable algorithm and, at stage 526, compares the algorithm results with the identification data. In one aspect, the algorithm results or output comprise decrypted data.

In one exemplary implementation of such an algorithm, where the encrypted data from the computer was produced using a first key located at the computer, the electronic device uses a corresponding, but different, second key stored in an ASIC, or other component of the electronic device, to decrypt the encrypted data received from the computer. The electronic device then compares the decrypted data with the identification data and, if the comparison is favorable, operation of the electronic device is then enabled. If the comparison is unfavorable, no enablement of the electronic device occurs. In at least some embodiments, the first key is a private or secret key, and the second key is a public key.

The comparison, or other evaluation, process may be tailored to suit the requirements of a particular application. In one instance, the evaluation of the encrypted data by the identification device is simply an inquiry as to whether or not the encrypted data or message was produced using the identification information and the first key. If the result of this inquiry is affirmative, then operation of the electronic device is enabled. If the result of the inquiry is negative, no enablement of the electronic device occurs.

If it is determined at stage 528 that the algorithm results correspond or match with the identification data, operation of the electronic device is enabled at stage 530. Alternatively, if it is determined at stage 528 that the algorithm results do not correspond or match with the identification data, the process 500 advances to stage 516 where the electronic device stops attempting to authorize enablement. At this point, the electronic device may still communicate with the remote computer, and may, in some implementations, retain at least some other partial operability without being fully operational. Additionally, when the electronic device terminates the method for authorizing enablement, the electronic device can display or otherwise present, such as by way of error codes or comparable indicia, an error message that notifies the user that enablement has not been authorized and/or that the enablement process has been terminated.

The method and process illustrated in FIG. 5 are exemplary, and various other methods and processes may alternatively be employed. For example in one alternative embodiment, the identification data and encrypted data are both processed through an algorithm. Accordingly, various procedures can be implemented in connection with the electronic device and the remote computer in order to compare, or otherwise evaluate, the identification data as the identification data relates to the encrypted data information sent by the remote computer.

Additionally, the security protocol can be extended to allow for multiple devices to communicate simultaneously with the remote computer, where the remote computer can generate encrypted data for multiple electronic devices and transmitting that data to the correct electronic devices at substantially the same time.

Figure 6:
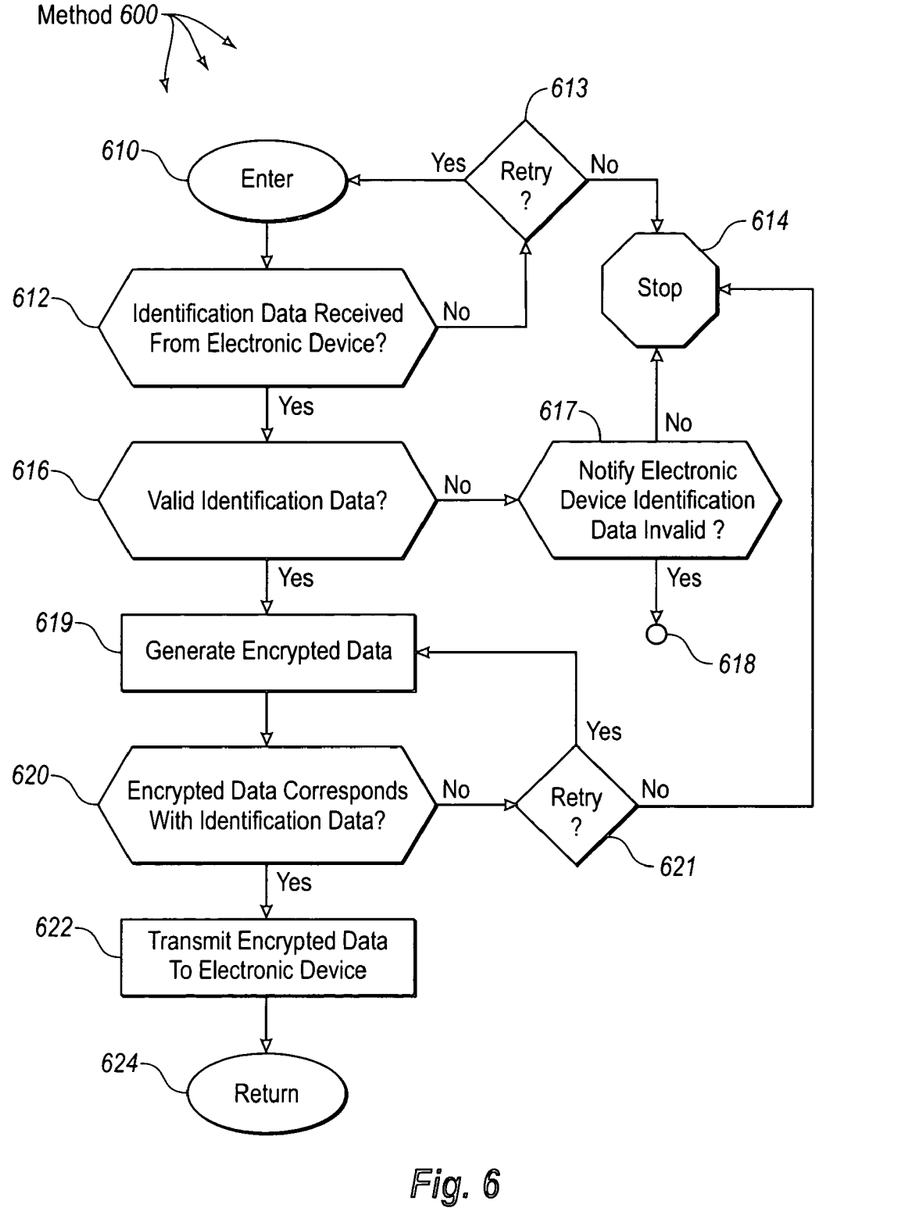
FIG. 6 is a flow diagram indicating general aspects of an exemplary method used by a remote computer to facilitate selective enablement of an electronic device.
Figure 7:
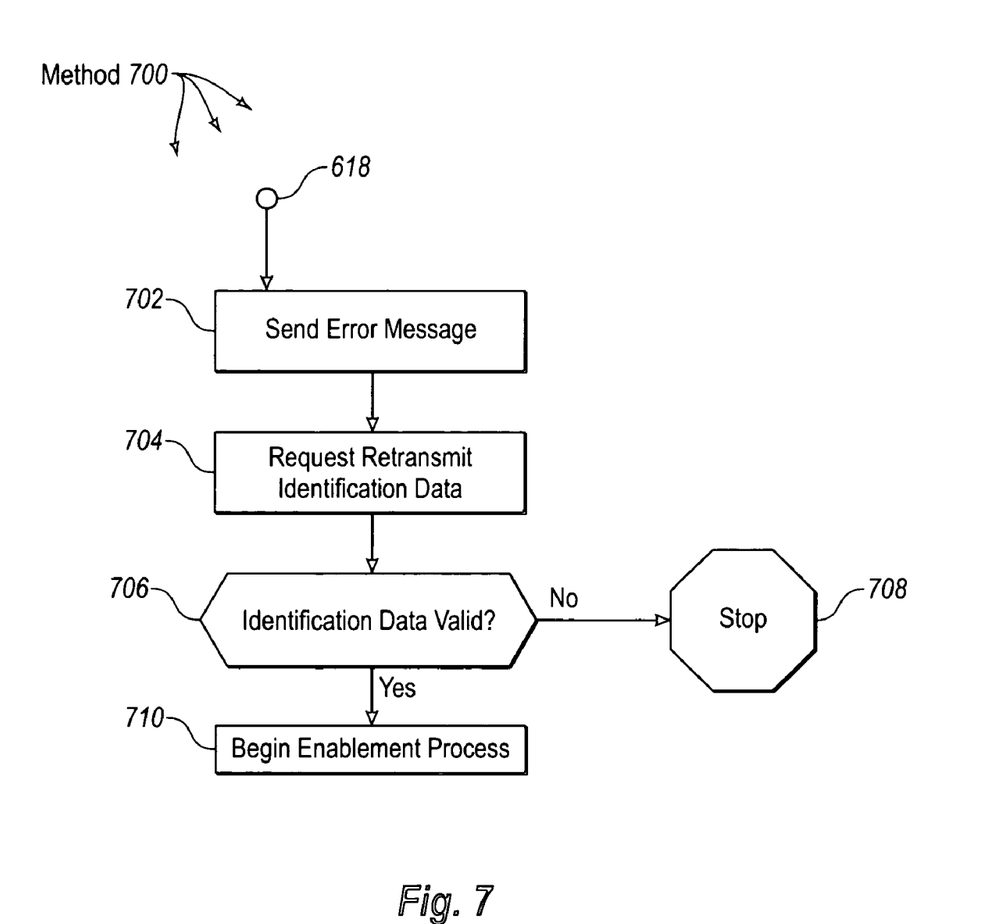
FIG. 7 is a flow diagram indicating general aspects of an exemplary method used by a remote computer to process invalid identification data.

With attention now to FIGS. 6 and 7, a method 600, which may be referred to herein as exemplifying a security protocol, for providing information to selectively enable an electronic device is now described. In general, the exemplary processes illustrated in FIGS. 6 and 7 are concerned with certain aspects of exemplary communication processes that occur between an electronic device and a remote computer, as such communication processes relate to enablement of the operation of the electronic device.

In one aspect, the method 600 of FIG. 6 involves the use of a computer program product in a computer configured to communicate with one or more electronic devices. The method can be entered into, at stage 610, at selected times, or the computer may constantly monitor connectivity with external and remote electronic devices. As the method 600 is initiated, the computer determines, at stage 612, whether identification data has been received from the electronic device in communication with the computer.

A determination that no identification data has been received results in the computer determining whether to retry, at stage 613, obtaining identification data or re-connecting with the electronic device or, at stage 614, to stop communication with the electronic device. Alternately, at any time it is determined that the authorization procedure cannot be completed, the computer can send an error message to the electronic device, or employ some other process of notifying the electronic device that the security protocol is not functioning properly and that authorization cannot be performed as a result.

On the other hand, after the computer has received identification data from the electronic device, the computer then determines, at stage 616, whether the identification data is valid. If the identification data is determined to be invalid, the computer determines at stage 617 whether or not to notify the electronic device that the identification data is invalid. If the computer notifies the electronic device that the identification data is invalid, the computer proceeds, at stage 618, through another sequence of events, discussed in further detail below in connection with FIG. 7. A decision not to notify the electronic device that the identification data is invalid stops communications between the computer and the electronic device and terminates the process 600 at stage 614.

However, valid identification data results in the generation, at stage 619, of encrypted data at the computer, where the encrypted data corresponds with the received identification data. In one embodiment, a redundant analysis can compare the identification data with the encrypted data to make sure that the two correspond. A correspondence, or lack of correspondence, can then be used at stage 620 to ensure the proper encrypted data has been generated. If it is determined at stage 620 that the encrypted data does not correspond with the identification data, the process 600 advances to stage 621 where the computer determines whether to retry generating encrypted data, send an error message to the electronic computer (not shown) or to return to stage 614, where communication with the electronic device is ended and the process 600 is terminated.

If the encrypted data corresponds with the identification data, determined at stage 620 or in the alternative, after the encrypted data is generated at stage 619, the process 600 advances to stage 622 where the computer transmits the encrypted data to the electronic device. After the encrypted data has been transmitted to the electronic device, the process 600 advances to stage 624 where the computer recommences monitoring for communications from other electronic devices. In one embodiment, the electronic device then processes the encrypted data from the remote computer as discussed above in connection with the exemplary process disclosed in FIG. 5.

Referring now to FIG. 7, details are provided concerning a method 700 that is generally concerned with an exemplary sequence of events that occurs where the computer attempts to obtain valid identification data from the electronic device, after having previously received invalid identification data from that electronic device. The method 700 of FIG. 7 is a continuation from stage 618 (FIG. 6).

At stage 702 of the method 700, the computer sends an error message to the electronic device stage 702 indicating that the identification data received from the electronic device is invalid. Next, at stage 704, the computer sends the electronic device a request for the electronic device to retransmit the identification data. The process then advances to stage 706 where the computer receives the retransmitted identification data from the electronic device and determines whether the retransmitted identification data is valid. If the identification data is determined to be invalid, the process 700 terminates at stage 708.

Depending upon the implementation, the method 700 may not be performed in some cases, so that one transmission of invalid data by the electronic device will stop the enablement process. Alternatively, the method 700 may be performed "n" times, or until valid data is received. Whenever the identification data is determined to be valid, the process 700 advances to stage 710 where the enablement process is commenced (see, for example, stage 619 of FIG. 6).

In another embodiment of the present invention, a method 800 for generating false data is now described with reference to FIG. 8. In general, the generation of false data in connection with the exemplary method 800 involves the use of invalid identification information as a basis for generation of false encrypted data that, when received by the electronic device, causes a desired effect with respect to the operation of the electronic device, such as the rendering of the electronic device permanently inoperable, or prevention of the enablement of one or more predetermined functionalities. In at least some implementations, the user of the electronic device is not made aware of the operation of the process until it becomes apparent to the user that the electronic device will not operate properly, if at all.

At stage 810 of the method 800, the computer determines whether the received identification data is from a stolen device. This determination is made, for example, by comparing the identification data with a database of stolen devices. If the identification data does not correspond with a stolen device, the method 800 terminates at stage 811. On the other hand, if it is determined that the identification data is from a stolen electronic device, the process 800 advances to stage 812 where the computer notifies a security administrator accordingly.

The security administrator can be a computer operable program designed to implement further security applications upon being notified of an attempt to operate a stolen device. Alternately, a security administrator can be a person responsible for monitoring the attempted use of stolen devices. The security administrator can then proceed with notifying the authorities of the attempted use, and/or to implement a procedure to locate the site of the attempted use.

Figure 8:
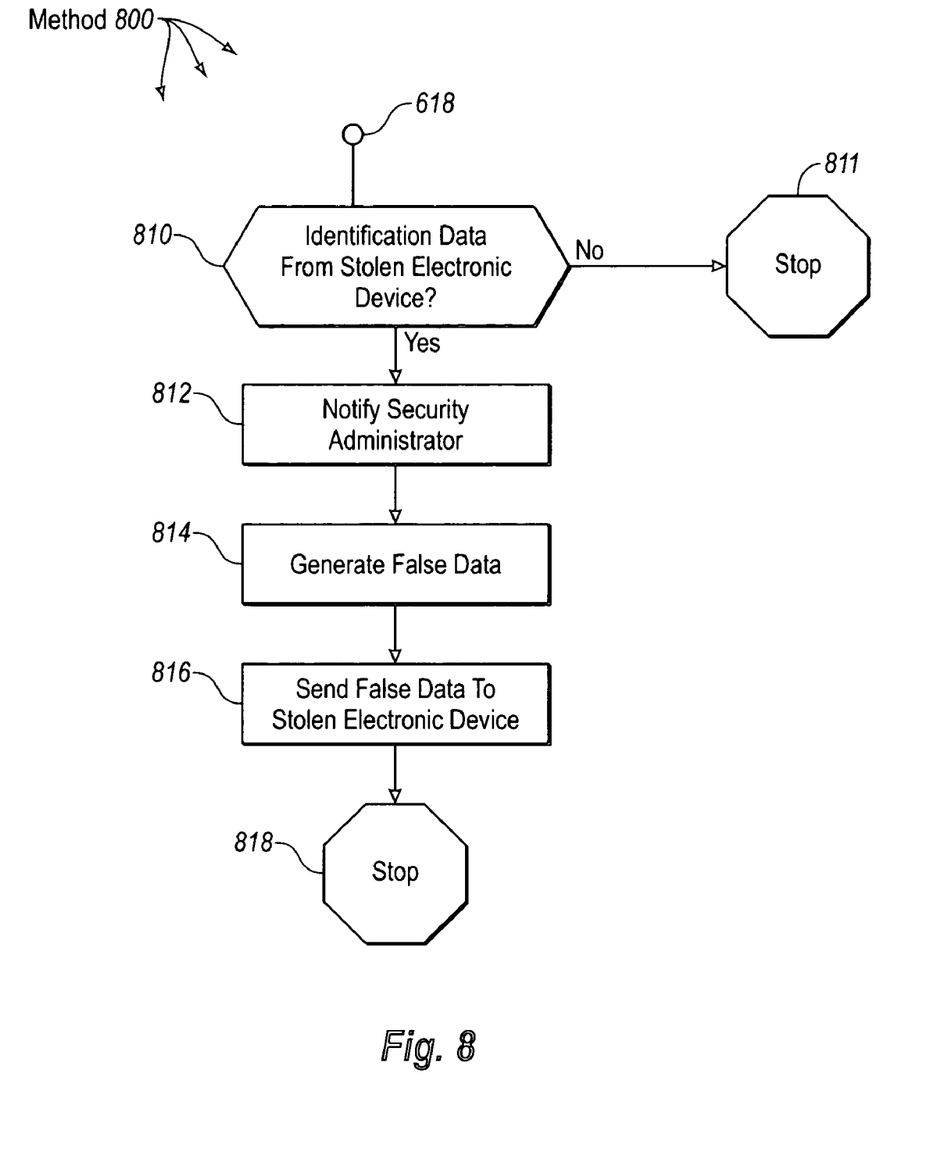
FIG. 8 is a flow diagram indicating general aspects of an exemplary method used by a remote computer to handle stolen electronic devices.

In continuing reference to FIG. 8, when the security administrator is notified that the identification data is from a stolen device, the method advances to stage 814 where the computer generates false data. In general, false data refers to any data, information, instructions or signals intended to disrupt, prevent, or disable operation of the electronic device to which the false data is transmitted. After false data is generated, the method 800 advances to stage 816 where the computer transmits the false data to the electronic device. As the electronic device attempts to process the false data through the algorithm, the corresponding effect on the electronic device can be tailored, as suggested above, to range from not enabling the electronic device or temporarily disabling the electronic device through permanently disabling the electronic device. After the false data is sent to the electronic device, the method 800 terminates at stage 818.

As disclosed herein, embodiments of the present invention may be implemented in connection with a special purpose or general purpose computer adapted for communication, over a network and/or by way of a dedicated communications link, with one or more electronic devices. Embodiments within the scope of the present invention also include computer-readable media for carrying or having computer-executable instructions or electronic content structures stored thereon, and these terms are defined to extend to any such media or instructions that are used with such computers and electronic devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device, such an optical transceivers and other devices for example, to perform a certain function or group of functions.

Although not required, aspects of the invention can be implemented in the general context of computer-executable instructions, such as are exemplified by program modules, being executed by computers or other processing devices in various environments. Generally, program modules include routines, programs, objects, components, and content structures that perform particular tasks or implement particular abstract content types. Computer-executable instructions, associated content structures, and program modules represent examples of program code for executing aspects of the methods and processes disclosed herein.

The hardware and methods described in accordance with the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for facilitating selective enablement of an optical transceiver that is configured for communication with a remote computer, comprising:
   determining, at the remote computer, whether identification data has been received from the optical transceiver including an optical transmitter and an optical receiver;
   determining whether the received identification data is valid; and
   when the received identification data is valid:
      generating encrypted data based upon the valid identification data; and
      transmitting the encrypted data from the remote computer to the optical transceiver,
      wherein the encrypted data and the identification data facilitate a determination as to whether operation of the optical transceiver will be enabled, a scope of the enablement being defined by a predetermined functionality profile, the predetermined functionality profile including a selected data rate enabled for the optical transceiver.

2. The method as recited in claim 1, wherein generation of the encrypted data is performed at least in part with a private key.

3. The method as recited in claim 1, further comprising:
   generating, at the computer, false data if the identification data is determined to be invalid; and
   transmitting the false data to the optical transceiver.

4. The method as recited in claim 1, further comprising performing at least one of the following if the identification data is determined to be invalid:
   sending an error message to the optical transceiver; and
   requesting the optical transceiver to retransmit the identification data.

5. The method as recited in claim 1, further comprising notifying an administrator if the identification data indicates the electronic device is stolen.

6. An optical transceiver, comprising:
   an optical transmitter;
   an optical receiver;
   a printed circuit board that includes circuitry configured to perform functions of the optical transceiver;
   a memory containing identification information unique to the optical transceiver;
   a communications port by way of which the identification data is transmitted to an external device; and
   a processor configured to receive data by way of the communications port and programmed to:
      decrypt encrypted data received at the optical transceiver from an external device; and
      use the decrypted data and the identification data to determine whether operation of the optical transceiver will be enabled, a scope of enablement being defined by a predetermined functionality profile that is associated with the operation of the optical transmitter and/or optical receiver.

7. The optical transceiver as recited in claim 6, wherein the memory and the processor collectively comprise an enablement microchip.

8. The optical transceiver as recited in claim 6, wherein the optical transceiver comprises an optoelectronic transceiver that includes a transmitter optical subassembly ("TOSA") and a receiver optical subassembly ("ROSA"), both of which are in communication with the circuitry of the printed circuit board.

9. The optical transceiver as recited in claim 6, wherein the identification data includes a serial number.

10. The optical transceiver as recited in claim 9, wherein the identification data further includes a complement to the serial number.

11. The electronic device as recited in claim 6, wherein the optical transceiver is enabled if the identification data corresponds with the encrypted data.

12. The electronic device as recited in claim 6, wherein the functionality profile provides that the optical transceiver can be operated for a set period of time if the electronic device is enabled.

13. The method according to claim 1, wherein the predetermined functionality profile is further defined such that one or more optical transceiver alarms are turned on or off.

14. The method according to claim 1, wherein the predetermined functionality profile is further defined such that the enabled functionality is limited so that only the transmitter, or only the receiver, is operable.

15. The electronic device as recited in claim 6, wherein the functionality profile provides that the optical transceiver can receive only a selected data rate or a group of data rates.

16. The electronic device as recited in claim 6, wherein the functionality profile provides engagement or disengagement of an alarm on the optical transceiver.

17. A method performed by a remote computer for selectively enabling a plurality of electronic devices that are configured for communication with the remote computer, comprising:
   receiving one set of identification data from each of the plurality of electronic devices at the remote computer;
   determining, at the remote computer, whether each set of identification data from each of the plurality of electronic devices is valid; and when the identification data sets are determined to be valid:
      generating, at the remote computer, multiple sets of encrypted data, wherein each set of encrypted data corresponds to a set of identification data from one of the plurality of electronic devices;

transmitting, each set of the multiple sets of encrypted data to its corresponding electronic device; and wherein the encrypted data and the identification data are designed to determine, when processed, whether operation of each of the plurality of electronic devices will be enabled, a scope of the enablement being defined by a predetermined functionality profile, wherein the functionality profile provides engagement or disengagement of an alarm on the electronic device.

18. The method as recited in claim 17, wherein the functionality profile further provides that the electronic device can receive only a selected data rate or a group of data rates.

* * * * *